United States Patent [19]

Wolf

[11] Patent Number: 5,737,393

[45] Date of Patent: Apr. 7, 1998

[54] SCRIPT-BASED INTERACTIVE VOICE MAIL AND VOICE RESPONSE SYSTEM

[75] Inventor: Richard J. Wolf, Crowley, Tex.

[73] Assignee: AST Research, Inc., Irvine, Calif.

[21] Appl. No.: 821,413

[22] Filed: Mar. 21, 1997

Related U.S. Application Data

[63] Continuation of Ser. No. 508,391, Jul. 31, 1995, abandoned.

[51] Int. Cl.[6] .................................................... H04M 1/64
[52] U.S. Cl. ........................... 379/67; 379/88; 379/89; 379/95; 379/96; 379/97
[58] Field of Search ............................... 379/67, 88, 89, 379/201, 214, 97, 211, 212, 93, 95, 188, 96

[56] References Cited

U.S. PATENT DOCUMENTS

| | | | |
|---|---|---|---|
| 4,594,476 | 6/1986 | Freeman | 379/73 |
| 4,866,756 | 9/1989 | Crane | 379/188 |
| 5,065,347 | 11/1991 | Pajak | 379/159 |
| 5,243,643 | 9/1993 | Sattar | 379/88 |
| 5,255,305 | 10/1993 | Satter | 379/97 |
| 5,329,578 | 7/1994 | Brennan et al. | 379/67 |
| 5,349,636 | 9/1994 | Irribarren | 379/67 |
| 5,393,964 | 2/1995 | Hamilton | 379/91 |
| 5,416,830 | 5/1995 | MacMillan, Jr. | 379/97 |
| 5,416,831 | 5/1995 | Chewning | 379/97 |
| 5,469,500 | 11/1995 | Satter et al. | 379/201 |

OTHER PUBLICATIONS

"Repartee Version 7.1—Telanophy Feature Package Guide", Active Voice Corporation, pp. 1, 2, 53, 55–57, 59, 65 and 67–69, Mar. 1994.

*Primary Examiner*—Krista Zele
*Assistant Examiner*—Scott Wolinsky
*Attorney, Agent, or Firm*—Knobbe, Martens, Olson & Bear, L.L.P.

[57] ABSTRACT

Method and a system for a user-customizable interactive voice mail/voice response system are disclosed. In a preferred embodiment, an interactive voice mail/voice response ("IVR") system of the present invention enables a user to build and operate custom IVR functions. The system comprises a voice menu system comprising a plurality of menus, each comprising a plurality of script records, and a scripting engine for providing event queuing functions to the voice mail system. When a menu is activated in response to an incoming call, the activated menu queues appropriate events with the script engine for playing a greeting to the telephone line and optionally requesting and verifying a password input by the caller. The menu then requests each record to queue events for providing a prompt indicating the key association and the purpose of the record. The engine processes the event queue and concurrently processes incoming keys, which are sent to the active script by the menu and then dispatched by the menu to the record with which the key is associated. The record responds with event requests appropriate to its implementation. This continues until the call is terminated. In one aspect of the invention, the script engine is connected to a script editing mechanism for enabling a user to create new menus, change the properties of existing menus, add records from an available inventory of record types and change the properties of existing records using a series of graphical user interface screens and dialog boxes designed for that purpose.

24 Claims, 8 Drawing Sheets

SCRIPT-BASED INTERACTIVE VOICE MAIL AND VOICE RESPONSE SYSTEM

This is a continuation of application Ser. No. 08/508,391 filed on Jul. 31, 1995, now abandoned.

TECHNICAL FIELD

The invention relates generally to interactive voice response and voice mail systems and, more particularly, to a script-based method of authoring such systems.

BACKGROUND OF THE INVENTION

Various types of interactive voice response systems are well known in the art and typically comprise some means for prompting a caller who has dialed into the system to enter information and/or questions, often in response to a menu of voice prompts issued via the handset of the caller's telephone, wherein caller entries generally consist of DTMF key tones generated using the keypad of the caller's telephone. For example, the caller may be prompted to enter a "1" to inquire about an account balance, a "2" to speak to a customer service representative, or a "0" to speak to the operator. Assuming the caller enters a "1" in response to the first series of prompts, the caller may be prompted to enter his or her account number, at which point, the system will determine the balance of the account associated with the entered account number and announce same to the caller.

Voice mail systems are typically designated as those in which a caller can leave a message for an intended recipient who is not available to take the call at the time the call is received in the system. The caller's message is stored in some type of central memory device, in which all messages received for all extensions on the system are stored, and is designated as being for a single extension. Only the designated recipient can retrieve the messages left for his or her extension. The set of messages designated as being for a single recipient is commonly referred to as the recipient's "voice mailbox," although the messages may be stored throughout the memory device.

Currently available interactive voice response and voice mail systems range high-end systems aimed at the large commercial consumers, which are typically complex systems custom designed to serve a variety of user-specified purposes, to lower-end systems aimed at the smaller commercial and individual consumers, which systems are typically less complex and capable of implementing fewer features. Moreover, although "lower end" systems have been developed which allow the user to customize certain voice mail and voice response features, such systems typically require a greater level of programming skill and knowledge than the average computer user is apt to possess.

Therefore, what is needed is an interactive voice mail/voice response system that is simple and straightforward enough for the average user to install, customize and operate.

SUMMARY OF THE INVENTION

The present invention, accordingly, provides a method and an interactive voice mail/voice response system that may be customized by a user to overcome or reduce disadvantages and limitations associated with prior methods and systems.

In a preferred embodiment, an interactive voice mail/voice response ("IVR") system of the present invention enables a user to build and operate custom IVR menus. The system comprises a voice menu system comprising a plurality of menus, each comprising a plurality of script record implementations, and a scripting engine for providing an event queuing mechanism to the menu records. The records in turn provide a sink mechanism for line events, such as DTMF key tones and telephone line state changes.

In operation, when a menu is activated in response to an incoming call, the menu queues any appropriate events with the script engine. These events typically play a greeting to the telephone line and optionally request and verify a password, which is input by the caller via the keypad of the telephone. The menu then requests each record to queue events. Typically these events provide a prompt indicating the key association and the purpose of the record. The engine then processes the event queue and concurrently processes incoming keys. Keys are sent to the active script by the menu and the menu, in turn, dispatches the key to the record with which the key is associated. The record then responds with event requests that are appropriate to its implementation. This continues until the caller hangs up or a record is invoked that terminates the call.

In one aspect of the invention, the script engine is connected to a script editing mechanism that allows the user to create new menus, change the properties of existing menus, add records from the available inventory of record types and change the properties of existing records quickly and easily via a series of graphical user interface screens and dialog boxes designed for that purpose.

A technical advantage achieved with the invention is that it provides a method of authoring IVR systems that are sophisticated and dynamic in nature without the use of complicated authoring systems, such as proprietary scripting languages, traditional programming languages or other complex techniques.

Another technical advantage achieved with the invention is that it provides a scripting engine that supports telephone line management and event queuing.

Yet another technical advantage achieved with the invention is that IVR responses are implemented in an object oriented manner, in which script records are subclasses of more basic IVR types.

Still another technical advantage achieved with the invention is the ability to present IVR systems as menus, or scripts, as a simple table of IVR objects.

Still another technical advantage achieved with the invention is that it provides the ability to reference menus from within another menu, thus achieving a versatile control mechanism presented to the user in a simple manner.

DESCRIPTION OF THE PREFERRED EMBODIMENTS

Figure 1A:
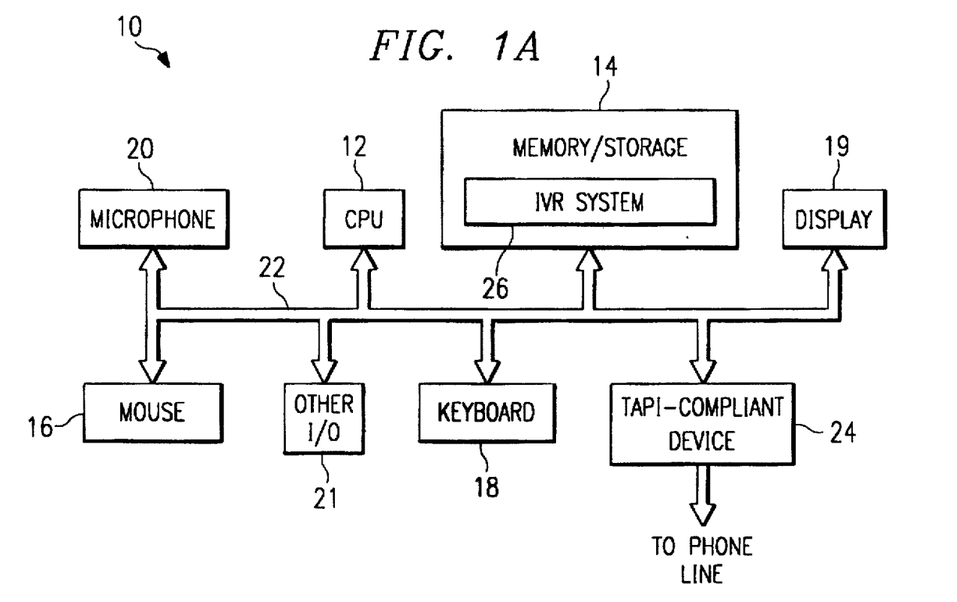
FIG. 1A is a system block diagram of a personal computer ("PC") embodying features of the present invention.

FIG. 1A illustrates a personal computer ("PC") 10 embodying features of the present invention. In particular, as shown in FIG. 1, the PC 10 comprises a central processing unit ("CPU") 12, memory and storage devices, collectively designated by a reference numeral 14, a mouse 16, a keyboard 18, a display 19, and a microphone 20 interconnected via one or more computer buses, shown in FIG. 1 as a bus 22. At least one Telephony Application Programming Interface ("TAPI") compliant device 24 is provided on the bus 22 for connecting the components of the PC 10 to a telephone line (not shown) and for providing the PC 10 with standard telephone capabilities. It will be recognized by those skilled in the art that "TAPI," which was jointly developed by Microsoft Corporation of Redmond, Wash., and Intel Corporation of Santa Clara, Calif., defines an interface between Microsoft Windows applications and telephone devices for providing a standard way to build telephone capabilities into Windows software. Alternatively, the device 24 may be a voice modem. As will be described, instructions for implementing an integrated voice mail/voice response ("IVR") system 26 are stored in the memory/storage device 14 for execution by the CPU 12.

Figure 1B:
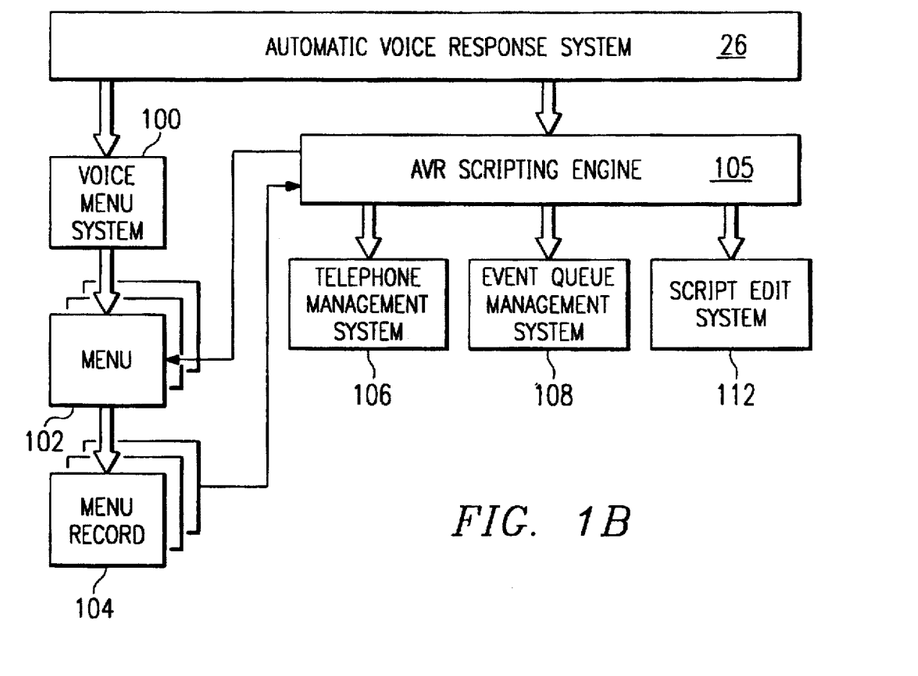
FIG. 1B is a conceptual block diagram of the integrated voice mail/voice response ("IVR") system of the present invention.

FIG. 1B is a conceptual block diagram of the IVR system 26 shown in FIG. 1A. In particular, the IVR system 26 comprises a voice menu system 100 that includes a plurality of menus 102. Each menu 102 includes a plurality of menu records 104. As will be described in greater detail below, the number of menus and records per menu is virtually unlimited and is established by the user. It should be noted, however, that the number of useful records is limited to the number of distinct DTMF tones that can be presented to the system, typically twelve, with a common telephone. The IVR system 26 further comprises an IVR script engine 105, which includes a telephone management system 106 for managing the device 24, an event queue management system 108 for queuing the appropriate events, as indicated by the menu records 104 of the current, or active, menu, with the script engine 105, and a script editing system 110 for enabling a user to add and delete menus 102 and menu records 104 from the voice menu system 100, as will be described.

Figure 2:
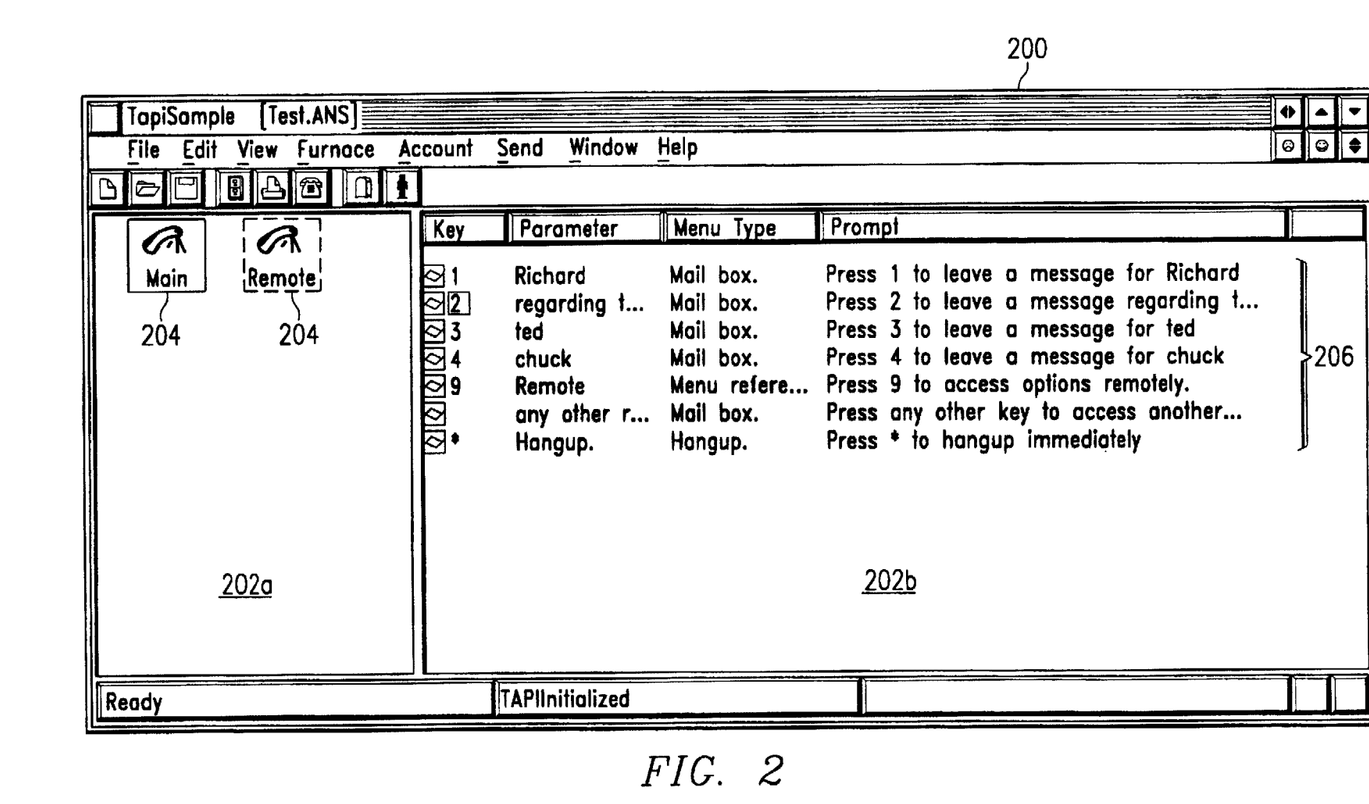
FIG. 2 illustrates a main screen of the user interface of the IVR system of the present invention.

In accordance with the features of the present invention, a user's use of the IVR system 26 is facilitated by the use of a plurality of graphical user interface ("GUI") screens and dialog boxes for display on the display 19. FIG. 2 illustrates a main screen 200 comprising a menu section 202a and a records section 202b. A plurality of menu icons 204, in this case, a "Main" icon and a "Remote" icon, are displayed in the menu section 202a. Upon selection of one of the menu icons 204 displayed in the menu portion 202a, a corresponding menu, or script, for the selected menu is displayed in the records section 202b. As shown in FIG. 2, the Main icon has been selected, resulting in the display in the records section 202b of the script 206. Each line of the displayed script 206 comprises an individual menu, or script, record and, for purposes to be described in detail below, each record of the script 206 includes a "Key" component, a "Parameter" component, a "Menu type" component, and a "Prompt" component.

As will be described in detail below, using the IVR system 26 of the present invention, the user is able to create, modify, and delete entire menus, such as Main or Remote, as well as one or more records within a menu. As will be recognized, a user can create as many different menus and corresponding scripts as he or she desires. It should be noted that, as used herein, "menu" and "script" may be used interchangeably to refer to a set of individual records.

Figure 3:
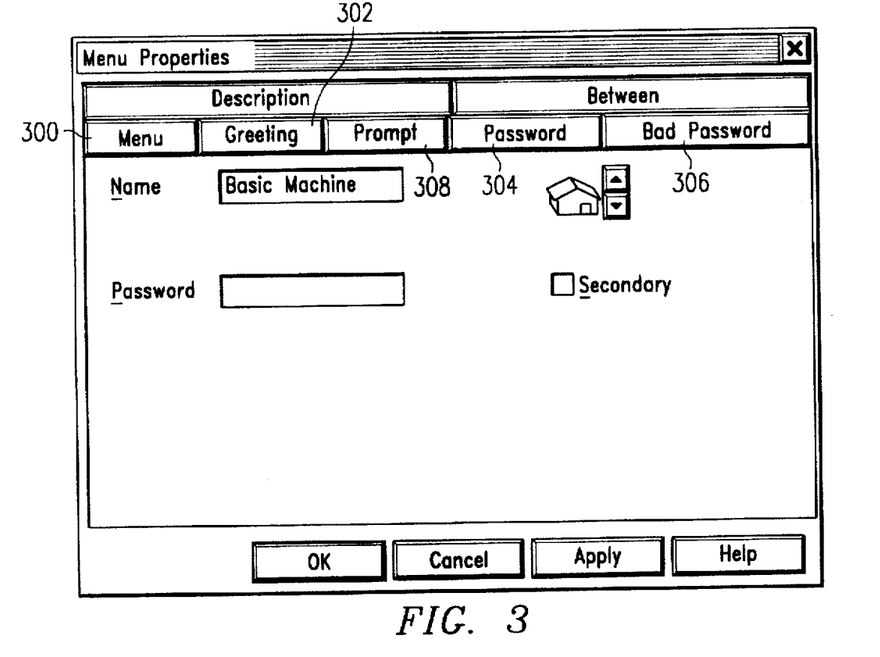
FIG. 3 illustrates a Menu Properties dialog box of the user interface of the IVR system of the present invention for creating and modifying menus.

To create a new menu, which will be represented by an icon similar to the icons 204 in the menu section 202a, the user accesses a "Menu Properties" dialog box, as shown in FIG. 3, through a series of appropriate menu picks, as will be recognized by those skilled in the art. From the Menu Properties dialog box, the user may select a Menu tab 300 to access a Menu page, which is shown in FIG. 3, to enter a name of the new menu, for example, "Basic Machine," a password to be associated with the menu which must be entered before a caller can access the menu, and an icon for representing the menu in the menu section 202a of the main screen 200 (FIG. 2). It should be noted that if a password is not entered on the Menu page, no password will be required and the menu will be freely accessible by callers. Similarly, although not shown, selection of a "Greeting" tab 302 results in the display of a Greeting page that enables the user to record a greeting for the menu. A typical greeting might be, for example, "Welcome to the XYZ company customer service facility."

As with all prompts described herein, the greeting is recorded by the user's typing the text of the greeting on the Greeting page (not shown) and then recording the audio greeting using the microphone 20. The recorded greeting will be stored as a sound file, most likely, a WAVE format file, designated as the greeting prompt for the corresponding menu, in this case, "Basic Machine." Alternatively, text-to-voice synthesis techniques may be used to convert the typed prompt to an audio prompt to be stored in the sound file for the prompt.

Selection of a "Password" tab 304 results in the display of a Password page (not shown), the format of which is similar to that of the Menu page shown in FIG. 3. Assuming that a password has been entered in the Menu page, the Password page may be used to record a password prompt to be played immediately before the greeting. A typical password prompt may be "Please enter your four character account number now." The password prompt is recorded in the same manner in which the greeting prompt is recorded, as described above. As previously indicated, if no password is entered on the Menu page (FIG. 3), it is not necessary to record a password prompt.

Selection of a "Bad Password" tab 306 results in the display of a Bad Password page (not shown), the format of which is similar to that of the Menu page shown in FIG. 3. As with the Password page, assuming a password has been entered on the Menu page (FIG. 3), the Bad Password page enables a user to record a bad password prompt to be played when a password entered by the caller in response to the password prompt is incorrect. A typical bad password prompt might be, for example, "The password you have entered is incorrect." At that point, the password prompt is replayed and the process is repeated until the caller enters the correct password or the call is terminated.

Finally, selection of a "Prompt" tab 304 results in the display of a Prompt page (not shown), the format of which is similar to that of the Menu page shown in FIG. 3. Using the Prompt page, the user may record a menu prompt for the current menu (i.e., Basic Machine) in the same manner in which the greeting prompt is recorded, as described above. A typical menu prompt might be "You may choose from the following options at any time during this call." The menu prompt will be played once the caller has entered the correct password in response to the password prompt, if a password is required, or immediately after the greeting, if no password is required. After the menu prompt is played, the individual record prompts, which are created in a manner to be described in detail below, are played in the order shown in the script for the menu.

Referring again to FIG. 2, once a menu has been created, as described above with reference to FIG. 3, the user may create and add records to the menu by selecting the icon associated with the menu to be modified from the menu section 202a, which results in the script associated with the selected icon being displayed in the script section 202b. At that point, the user may modify the script by accessing a script record type menu (not shown) comprising a series of menu picks, each associated with an available type of record. For example, in the current embodiment, there are four types of script records, including a "Mailbox" record for enabling a caller to record a message, and then depositing the recorded message in the corresponding mailbox location, a "Menu Reference" record for enabling a caller to activate, or access, a second menu from a first menu, a "Read Mailbox" record for enabling a caller to read messages previously deposited in his or her mailbox, and a "Hangup" record for terminating the call; however, it should be recognized that any number of different types of records having various different properties may be implemented using the system 26.

Figure 4:
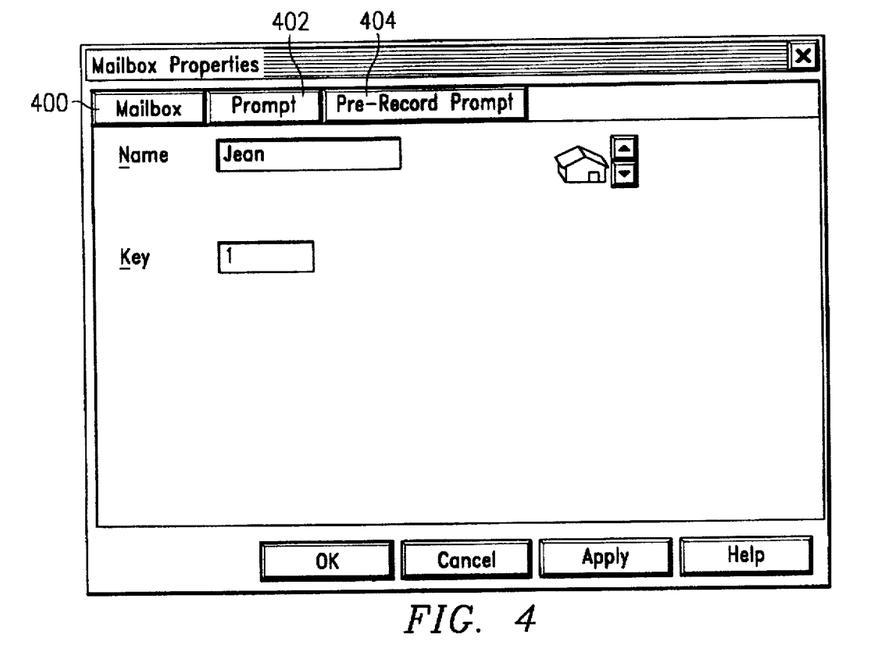
FIG. 4 illustrates a Mailbox Properties dialog box of the user interface of the IVR system of the present invention for creating and modifying Mailbox records.

Selection of the Mailbox menu pick from the script record type menu results in the display of a Mailbox Properties dialog box, as shown in FIG. 4, for use in creating a Mailbox-type record. Selection of a "Mailbox" tab 400 results in the display of a Mailbox page, as illustrated in FIG. 4, which enables the user to enter the name of the mailbox, in this case "Jean," a DTMF key to be associated with the mailbox, in this case, "1," for accessing the mailbox from the menu, and also an icon for representing the record if desired. Selection of a "Prompt" tab 402 results in the display of a Prompt page (not shown) for enabling the user to record a prompt to be played in connection with the record. In this case, a typical prompt might be "Press 1 to leave a message for Jean." Selection of "Pre-record prompt" tab 404 results in the display of a Pre-record prompt page (not shown) for enabling the user to record a prompt to be played after the record is selected by the remote caller by pressing the corresponding DTMF key, as designated on the Mailbox page (FIG. 4) and just before the incoming message is recorded. A typical pre-record prompt might be "At the sound of the tone, please leave a message for Jean."

Referring again to FIG. 2, it will be recognized that, for records created using the Mailbox Properties dialog box described above, the "Name" and "Key" entered on the Mailbox page (FIG. 4) will be respectively displayed as the "Parameter" and "Key" components of the associated record, the prompt entered on the Prompt page (not shown) will be displayed as the "Prompt" component of the record, and "Mailbox" will be displayed as the "Menu type" component of the record.

Figure 5:
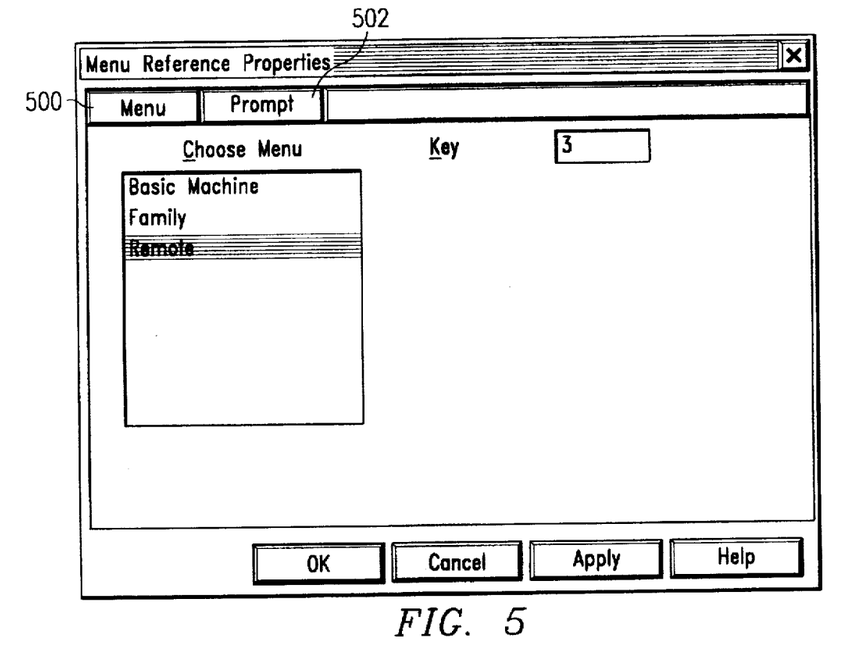
FIG. 5 illustrates a Menu Reference Properties dialog box of the user interface of the IVR system of the present invention for creating and modifying Menu Reference records.

FIG. 5 illustrates a Menu Reference Properties dialog box for use in defining a Menu Reference-type record. A Menu Reference record enables a remote caller to reference, or access, another menu from within a first menu. For example, as shown in FIG. 2, the system may be set up to have a Main menu that is encountered by all callers when they call into the system, and a Remote menu that enables callers to access their own mailbox to retrieve their messages remotely. In this situation, the Remote menu could be referenced by, and thereby accessible through, a record within the Main menu. For example, in the script 206 shown in FIG. 2, pressing "9" enables the caller to access the Remote menu. Similarly, the Main menu might be referenced by a record in the Remote menu such that callers could return to the Main menu from the Remote menu after listening to their messages, if they so desired.

Accordingly, selection of a Menu tab 500 of the Menu Reference Properties dialog box results in the display of a Menu page, as shown in FIG. 5, for enabling the user to select from among previously created menus and assign a key for accessing the selected menu from the current menu. Similarly, selection of a "Prompt" tab 502 results in the display of a Prompt page (not shown) similar to the Menu page (FIG. 5) for enabling the user to record a prompt to be associated with the record, for example, "Press 9 to access options remotely." Referring again to FIG. 2, it will be recognized that for records created using the Menu Reference Properties dialog box shown in FIG. 5, the "Key" and menu selected on the Menu page are respectively displayed as the "Key" and "Parameter" components of the corresponding record, the prompt entered on the Prompt page is displayed as the "Prompt" component of the record, and "Menu reference" is displayed as the "Menu type" component of the record.

Figure 6:
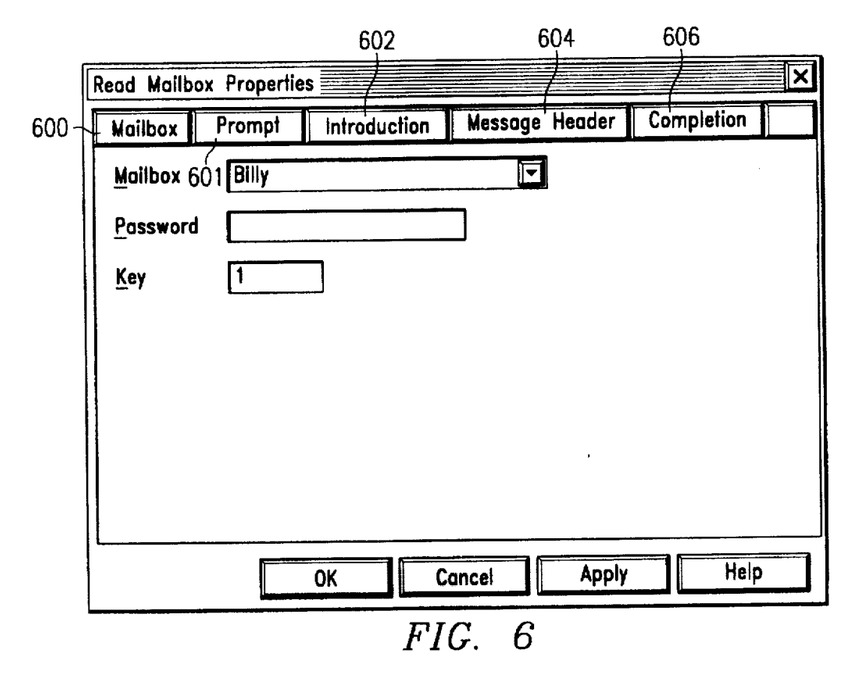
FIG. 6 illustrates a Read Mailbox Properties dialog box of the user interface of the IVR system of the present invention for creating and modifying Read Mailbox records.

FIG. 6 illustrates a Read Mailbox Properties dialog box for use in creating a record for enabling a user to retrieve messages from his or her mailbox. It should be apparent that this type of record would typically be included in a "Remote" menu. Referring to FIG. 6, selection of a "Mailbox" tab 600 results in the display of a Mailbox page, as illustrated in FIG. 6, for enabling a user to select from among mailboxes that have previously been created using the Mailbox dialog box (FIG. 3), assign a key to the record and optionally assign a password for accessing the associated mailbox. Selection of a "Prompt" tab 601 results in the display of a Prompt page (not shown) for enabling the user to record a prompt for the record. A typical prompt might be, for example, "Press 1 to access Billy's mailbox." Similarly, selection of an "Introduction" tab 602 results in the display of an Introduction page (not shown) for enabling the user to select a format for an introduction to be played to the remote caller before any messages are played. A typical introduction might be, for example, "You have # messages," where # represents the number of messages as determined by the system 26. Selection of a "Message Header" tab 604 results in the display of a Message Header page (not shown) for enabling the user to select a format for a message header to be played before each individual message, for example, "Message 2 of 4 from John Smith on July 5 at 12:00 P.M." Selection of a "Completion" tab 606 results in the display of a Completion page for enabling the user to record or select a completion message for indicating that all of the messages have been played.

Referring again to FIG. 2, for each record created using the Read Mailbox Properties dialog box shown in FIG. 6, the "Mailbox" and "Key" entries are respectively displayed as the "Parameter" and "Key" components of the record, the prompt recorded using the Prompt page is displayed as the "Prompt" component of the record, and "Read Mailbox" is displayed as the "Menu type" component of the record.

Although not shown, it should be recognized that a Hangup Properties dialog box for use in creating a record for enabling a user to terminate the call by pressing a key would also be provided. In particular, a Hangup Properties dialog box would enable a user to record a prompt for and assign a key to the record, in a manner similar to that described above with reference to FIGS. 4, 5 and 6.

Referring again to FIG. 2, for each record created using the Hangup Properties dialog box (not shown), it will be recognized that the "Key" component will display the key associated with the record, the "Parameter" and "Menu type" components will each display "Hangup" and the "Prompt" component will display the prompt recorded using the Hangup Properties dialog box.

As previously indicated, the user can create any number of different menus comprising any number of records for controlling the operation of the IVR system 26. Referring to FIG. 2, assuming the Main menu is set as the default menu, i.e., the menu that is initially accessed when a caller calls into the system 26, the operation of the system 26 in response to an incoming call will now be described with reference to FIGS. 7–14. Referring briefly to FIG. 1B, as previously indicated, the scripting engine 105 provides telephone line management and an event queuing mechanism to the menu records 104. The records 104, in return, provide a sink mechanism for line events, such as receipt of DTMF key tone tones resulting from an caller's depression of keys and line state changes, such as a hang up. The engine can be notified of a script, or menu, change by a menu record 104 action, thereby giving the effect of nested menus and other complicated presentations without the user of conventional programming techniques on the part of the script, or menu, author.

When one of the menus 102 is activated, the menu queues any appropriate events with the scripting engine 105. In particular, the queuing of events involves creating an object for performing the specified function. These events typically play a greeting to the telephone line and optionally request and verify a password input using the DTMF keys. It will be recognized that whether or not a greeting is played, a password is requested, etc., will depend on how the active menu has been set up by the user, as shown and described with reference to FIG. 3. The menu then requests each record to queue events. Typically these events provide a prompt indicating the key association and the purpose of the record. Again, the events queued by each record will be determined by how that record was set up by the user, as shown and described with reference to FIGS. 4–6. The engine 105 processes the event queue and concurrently processes DTMF key tones. Keys are sent to the active menu by the engine 105, which in turn dispatches the key to the record with which the key is associated. That record then responds with events that are appropriate to its implementation. This continues until the caller hangs up or a record is invoked that terminates the call.

Figure 7:
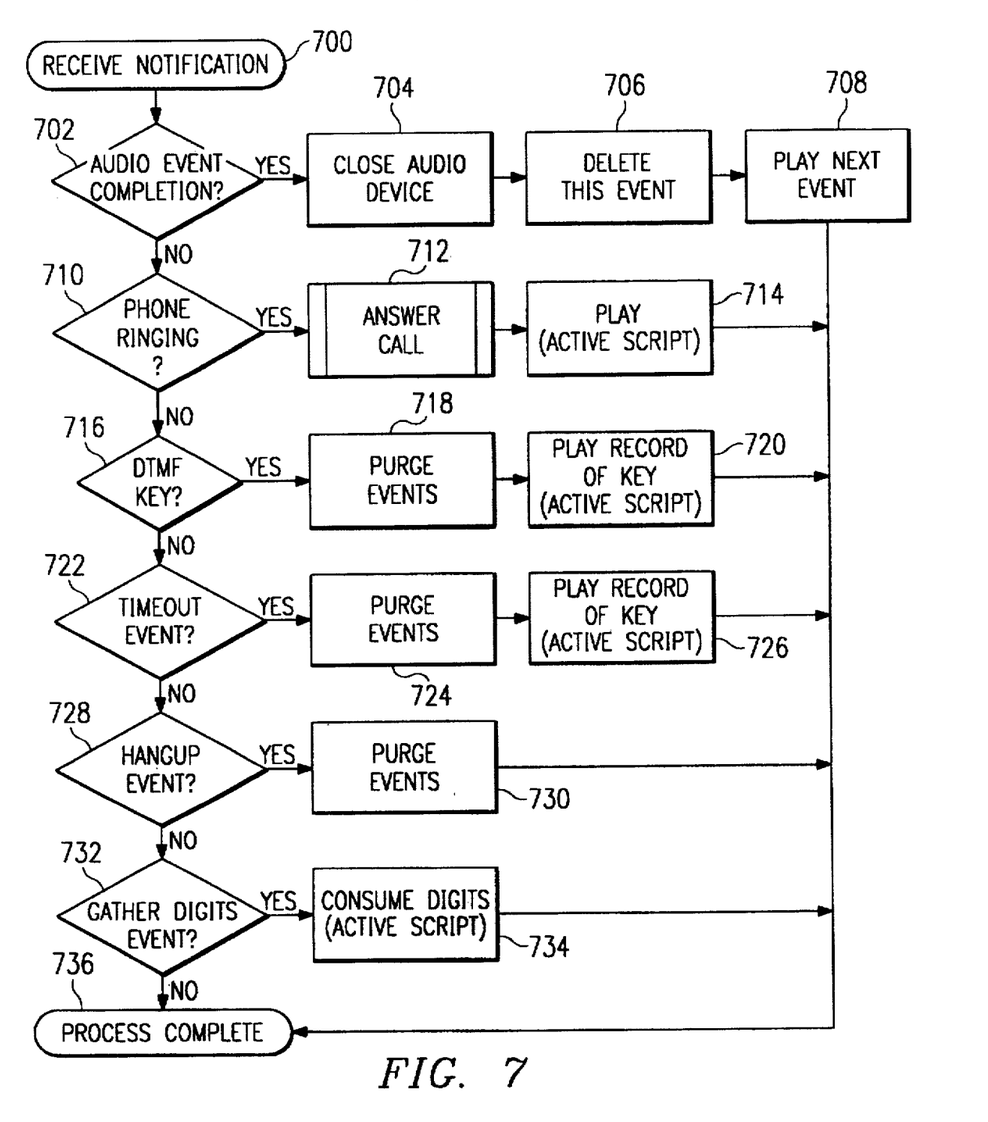
FIGS. 7, 8, 9A, 9B, and 10–14 are flowcharts illustrating the operation of the IVR system of the present invention.

Referring now to FIG. 7, execution begins in step 700 upon receipt by the system 26 of a notification that an action performed external to the system 26 is complete. Upon receipt of a notification in step 700, execution proceeds to step 702, in which a determination is made whether the notification corresponds to an audio event completion notification. In particular, an audio event completion notification will be generated by the operating system when an audio event, such as the playing of a prompt to a caller or the recording or retrieval of a message by a caller, has been completed. If an audio event completion notification has been received, execution proceeds to step 704, in which the audio device that performed the audio event is closed, and then to step 706, in which the event is deleted from the queue. Execution then proceeds to step 708, in which a "play next event" routine, as shown and described with reference to FIG. 8, is executed.

Figure 8:
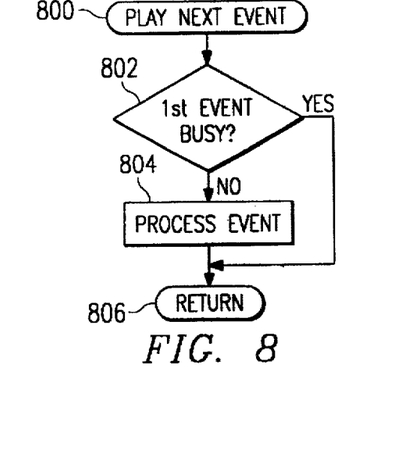

Referring to FIG. 8, execution of the play next event routine begins in step 800. In step 802, a determination is made whether the first event in the queue is busy; that is, whether the event is being executed. It should be noted that, because the queue is implemented as a "first-in-first-out" queue, the "first event" in the queue refers to the top event in the queue, i.e., the oldest event therein remaining to be processed. If in step 802 it is determined that the first event is not busy, execution proceeds to step 804. In step 804, the first event is "requested." For example, in step 804, if the event is prompt, the requesting of the event causes the prompt to be played to the user; if the event is a timeout, the requesting of the event causes the operating system to schedule a timer; if the event is a record message event, the requesting of the event causes an incoming message to be recorded. Because the requesting of events will be understood to those skilled in the art of object oriented programming, it will not be described in further detail herein. After the event is requested in step 804, execution returns to the step that invoked the routine in step 806. If in step 802 it is determined that the first event is busy, execution proceeds directly to step 806.

Referring again to FIG. 7, if in step 702, it is determined that the notification is not an audio event completion notification, execution proceeds to step 710, in which a determination is made whether it is a notification that the phone is ringing. If so, execution proceeds to step 712, in which the system 26 answers the call, and then to step 714, in which a "play script" routine is executed, as described with reference to FIG. 9A.

Figure 9A:
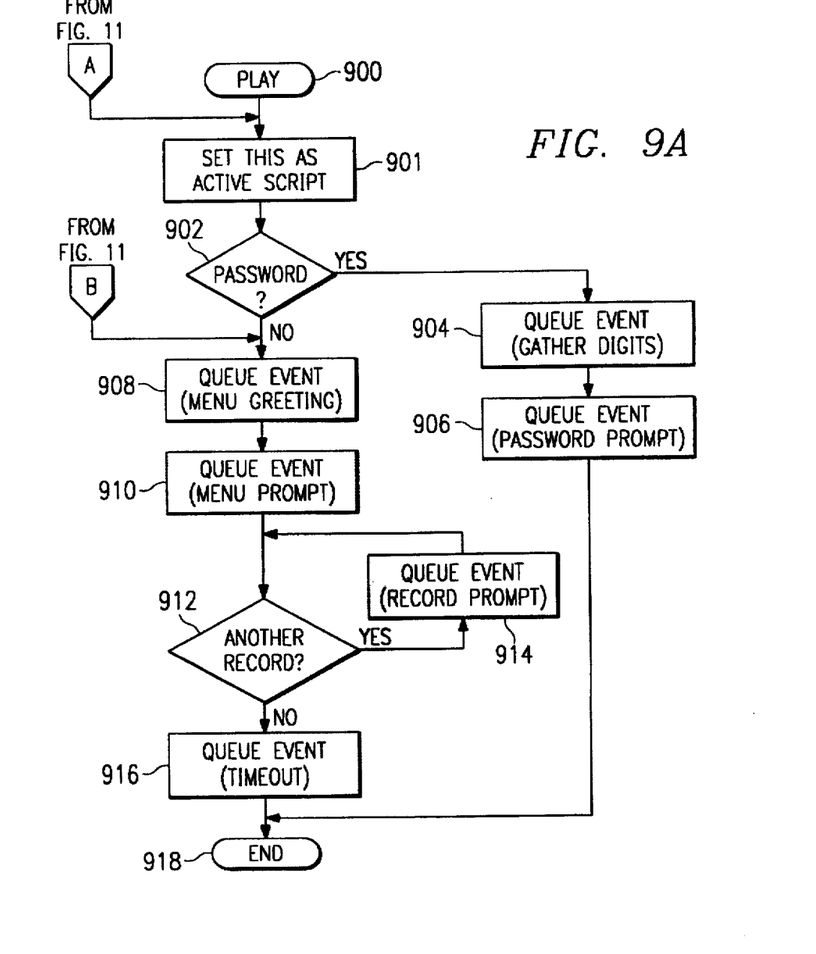
Figure 9B:
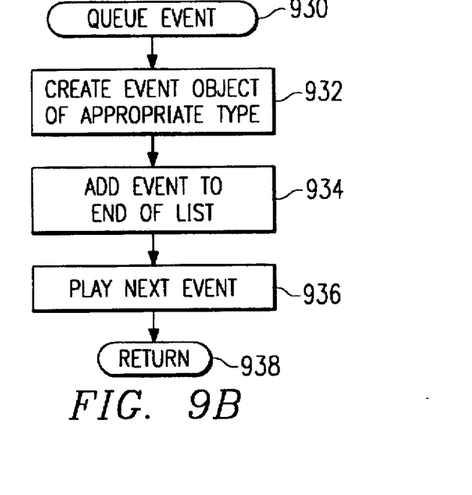

Referring now to FIG. 9A, execution of the play script routine begins in step 900. In step 901, the current script, or menu, is designated as the active script. For example, as described above with reference to FIG. 2, the Main menu will most likely be the initial active menu. In step 902, a determination is made whether a password is required for the active menu. If so, execution proceeds to step 904, in which a "queue events" routine, as will be described in detail with reference to FIG. 9B, is executed to queue a gather digits event for processing by the engine 105. In step 906, the queue events routine (FIG. 9B) is executed to queue a password prompt. If in step 902, it is determined that no password is required, execution proceeds to step 908, in which the queue events routine (FIG. 9B) is executed to queue the greeting for the active menu, and then to step 910, in which the queue events routine (FIG. 9B) is executed to queue the menu prompt for the active menu. Execution then proceeds to step 912, in which a determination is made whether there is another record in the menu to be processed. If so execution proceeds to step 914, in which the queue event routine (FIG. 9B) is executed to queue the prompt for the next record, and then returns to step 912. If in step 912 it is determined that no records remain to be processed, execution proceeds to step 916, in which the queue event routine (FIG. 9B) is executed to queue a timeout event and then to step 918, in which the process is terminated. Similarly, upon completion of step 906, execution proceeds directly to step 918.

Referring now to FIG. 9B, the queue events routine will be described in greater detail. Execution of the routine begins in step 930. In step 932, an event object of the appropriate type is created, it being understood that the type of event object queued in step 932 will depend on the type of event, e.g., prompt, timeout, etc., to be queued. In step 934, the event object is added to the end of the list, or queue.

In step 936, the play next event routine (FIG. 8) is executed. In step 938, execution returns to the calling step.

Referring again to FIG. 7, if in step 710, it is determined that the phone is not ringing, execution proceeds to step 716, in which a determination is made whether a DTMF key tone has been received. If so, execution proceeds to step 718, in which any currently busy event is stopped and all previously queued events are purged from the queue and then to step 720, in which a "play record of key" routine is executed, as described in detail with reference to FIG. 10.

Figure 10:
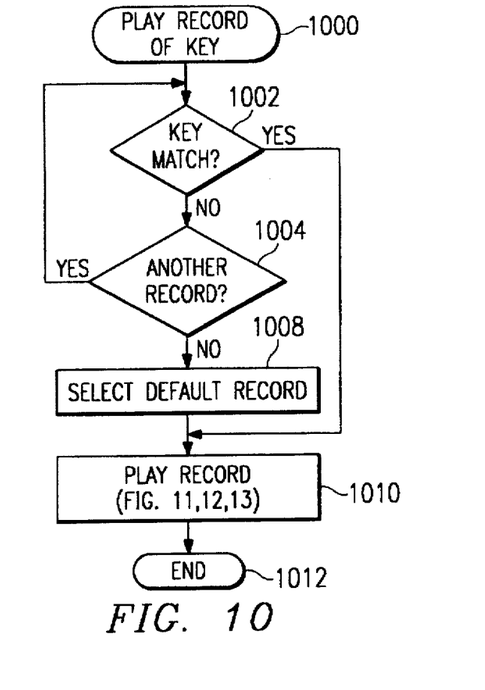

Referring to FIG. 10, execution of the play record of key routine begins in step 1000. In step 1002, a determination is made whether the first record in the script is the record identified by the received key tone, it being understood that this step is performed by comparing the entered key to the key specified in the record in the "Key" component. If not, execution proceeds to step 1004, in which a determination is made whether there are more records in the active menu. If so, execution returns to step 1002 and the next record is compared. If in step 1004 there are no more records, a default record, typically a record for which a key has not been designated, is selected in step 1008 and played in step 1010, as described with reference to FIG. 12, 13 or 14, depending on whether the record is a Mailbox, Read Mailbox, or Menu Reference type record. If the record is a Hangup type record, a hangup event notification is generated (see step 728, FIG. 7). Similarly, if in step 1002, a match is found, execution proceeds directly to step 1010 and the matching record is played. The routine terminates execution in step 1012.

Referring again to FIG. 7, if in step 716 a DTMF key tone was not received, execution proceeds to step 722. In step 722, a determination is made whether the notification was a timeout generated responsive to the timing out of a timer set in step 1016 (FIG. 10). If so, execution proceeds to step 724, in which any currently busy event is stopped and the events are purged from the queue, and then to step 726, in which the play record of key routine, described above with reference to FIG. 10, is executed. The key associated with the timeout event is one that is not associated with any record in the active script.

If in step 722, it is determined that a timeout has not been received, execution proceeds to step 728, in which a determination is made whether a hangup occurred. If so, execution proceeds to step 730, in which any currently busy events are stopped and the events are purged from the queue; otherwise, execution proceeds to step 732. In step 732, a determination is made whether the event was a gather digits notification. If so, execution proceeds to step 734 in which a "consume digits" routine, described in detail with reference to FIG. 11, is executed.

Figure 11:
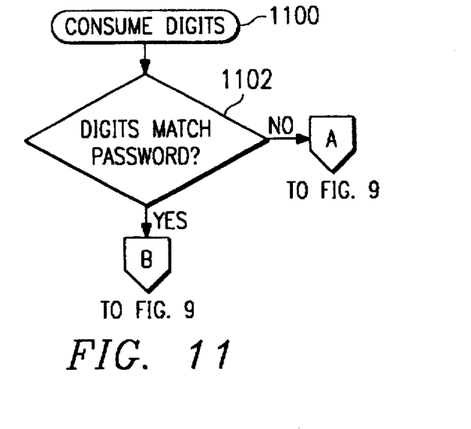

Referring to FIG. 11, execution of the consume digits routine begins in step 1100. In step 1102, a determination is made whether the digits entered match the appropriate password. If so, execution returns to step 901 (FIG. 9A); otherwise, execution returns to step 908 (FIG. 9A).

Figure 12:
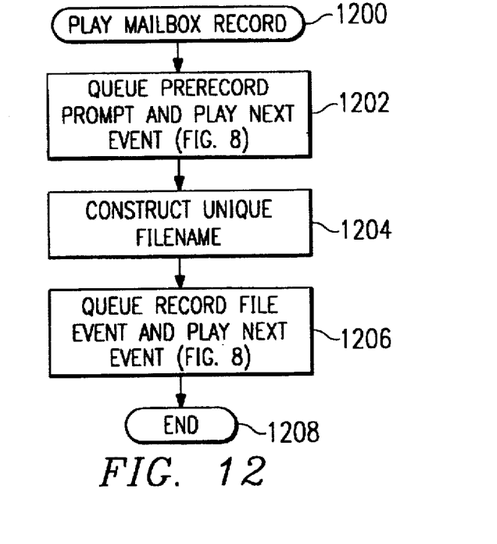

Referring again to step 1010 (FIG. 10), assuming the record to be played is a Mailbox record, a "play mailbox record" routine, as shown and described with reference to FIG. 12, is executed to play the record. Referring to FIG. 12, execution of the play mailbox record routine begins in step 1200. In step 1202, the prerecord prompt, if any, for the record is queued. In step 1204, a unique filename is constructed for storing the message. In step 1206, a record file event for recording the message in the file is queued. Execution then terminates in step 1208.

Figure 13:
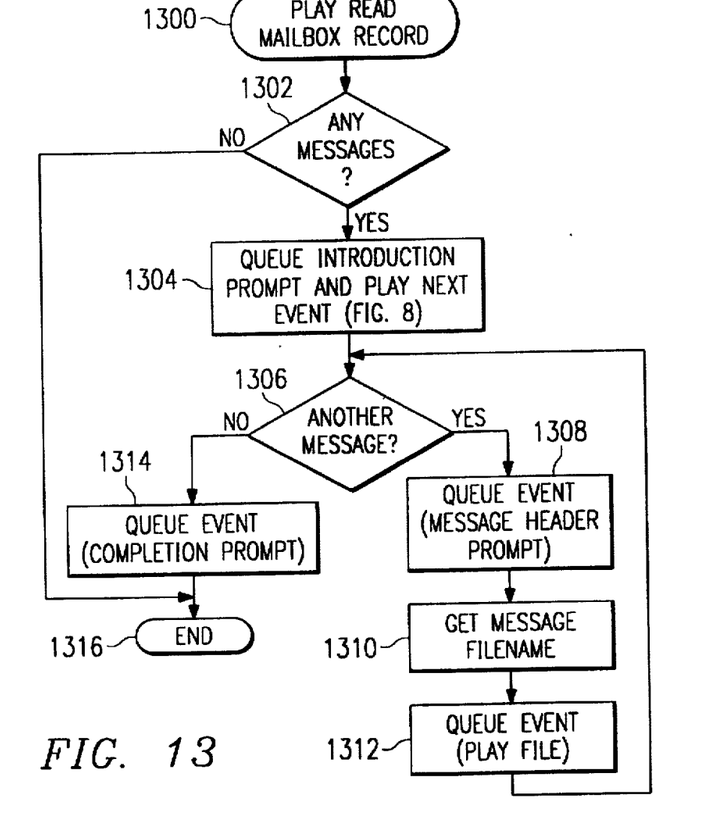

If in step 1010 (FIG. 10), the record to be played is a Read Mailbox record, a "play read mailbox record" routine, as shown and described with reference to FIG. 13, is executed to play the record. Referring to FIG. 13, execution of the play read mailbox record routine begins in step 1300. In step 1302, a determination is made whether there are any messages in the mailbox designated by the record. If so, execution proceeds to step 1304, in which the introduction prompt for the record is queued. In step 1306, a determination is made whether there is another message. If so, execution proceeds to step 1308, in which the message header for the record is queued, and then to step 1310, in which the message filename is obtained. In step 1312, a play file audio event is queued, and then execution returns to step 1306. If in step 1306, it is determined that there are no more messages, execution proceeds to step 1314, in which the completion prompt for the record is queued. Execution then terminates in step 1316. Similarly, if in step 1302 it is determined that there are no more messages, execution proceeds directly to step 1316.

Figure 14:
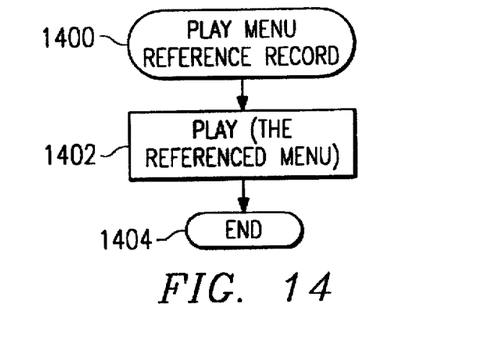

If in step 1010 (FIG. 10), the record to be played is a Menu Reference record, a "play menu reference record" routine, as shown and described with reference to FIG. 14, is executed to play the record. Referring to FIG. 14, execution of the play menu reference record routine begins in step 1400. In step 1402, the referenced menu is activated and execution terminates in step 1404.

As described above, the present invention provides a method of authoring IVR systems that are sophisticated and dynamic in nature without the use of complicated authoring systems, such as proprietary scripting languages, traditional programming languages, or other complex techniques. Because the invention displays the each IVR system menu as a simple table with "point and click" editing, the task of creating and modifying a menu is greatly simplified. Accordingly, complex menu sequences can be implemented by requesting script records that perform control features in a straightforward manner.

It is understood that the present invention can take many forms and embodiments, the embodiments shown herein are intended to illustrate rather than limit, the invention, it being understood that variations may be made without departing from the spirit of the scope of the invention. For example, records could be easily implemented to play a particular message, i.e., a "memo," to look up values from a database based on DTMF codes and/or CALLERID information, faxback documents, forward messages, provide pager notification, and so on. Moreover, prompts could be recorded using any number of different types of technology, including automatic text-to-voice simulation for converting the text prompt to an audio prompt, or using prerecorded prompts alone or in combination with user-recorded prompts.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of implementing a user-definable interactive voice mail/voice response (IVR) system on a personal computer (PC) having a display, the method comprising user-implemented steps of:

creating at least one menu for implementing a plurality of IVR functions selected by a user, said creating including defining properties of said at least one menu using a menu dialog box displayed on a display of said PC;

adding at least one menu record for implementing an IVR function to said at least one menu, said adding comprising:

selecting a type of menu record to be added; and defining properties of said menu record using a menu record dialog box displayed on said display in response to selecting said menu record type; and graphically representing on said display said at least one menu including said at least one menu record.

2. The method of claim 1 wherein said properties of said at least one menu include one or more of a name of said at least one menu, a password associated with said at least one menu, an icon for representing said at least one menu on a main screen display, and at least one prompt to be played to a caller over a telephone line to which said PC is electrically connected.

3. The method of claim 2 further comprising recording said at least one prompt and representing a script of said at least one prompt on said display.

4. The method of claim 1 wherein said selected menu record type is a mailbox record and wherein said properties of said menu record include one or more of a mailbox name, a DTMF key associated with said mailbox record for accessing said mailbox record and at least one prompt to be played to a caller via a telephone line to which said PC is electrically connected.

5. The method of claim 4 further comprising recording said at least one prompt.

6. The method of claim 1 wherein said selected menu record type is a menu reference record and wherein said properties of said menu record include one or more of a referenced menu name, a DTMF key associated with said menu reference record for accessing said menu reference record and a prompt to be played to a caller via a telephone line to which said PC is electrically connected.

7. The method of claim 6 further comprising recording said prompt.

8. The method of claim 1 wherein said selected menu record type is a read mailbox record and wherein said properties of said menu record include one or more of a mailbox name, a password associated with said read mailbox record, a DTMF key associated with said read mailbox record, and at least one prompt to be played to a caller via a telephone line to which said PC is electrically connected.

9. The method of claim 8 further comprising recording said at least one prompt.

10. The method of claim 1 wherein said selected menu record type is a hangup record and wherein said properties of said menu record include a DTMF key associated with said hangup record and a prompt to be played to a caller via a telephone line to which said PC is electrically connected.

11. The method of claim 10 further comprising recording said at least one prompt.

12. A method of operating an interactive voice mail and voice response (IVR) system on a personal computer (PC) having a display and electrically connected to a telephone line, the IVR system comprising at least one menu for implementing a plurality of user-selected IVR functions in an order defined by a user and comprising a plurality of menu records each having associated therewith one of said user-selected IVR functions, the method comprising the steps of:

(a) presenting on said display a graphical representation of said at least one menu;

(b) said user selecting a menu graphically represented on said display by selecting said graphical representation thereof;

(c) responsive to detection of a ringing signal on said telephone line, answering said telephone line and activating said selected menu;

(d) playing at least one prompt associated with said selected menu to a caller over said telephone line;

(e) for each menu record in said selected menu, playing a first prompt associated with said menu record for instructing said caller regarding how to initiate an IVR function associated with said menu record; and (f) responsive to receipt of a DTMF tone associated with one of said menu records over said telephone line, interrupting execution of step (e) and performing an IVR function associated with said one menu record.

13. The method of claim 12 wherein step (d) further comprises:

prompting said caller to enter a password;

determining whether said entered password is valid for said selected menu; and responsive to a determination that said entered password is not valid, repeating said prompting and determining until a valid password is entered or until a hangup is detected on said telephone line.

14. The method of claim 12 wherein said one menu record comprises a mailbox type record and wherein said performing an IVR function associated with said one menu record comprises:

prompting said caller to record a message;

recording said message; and storing said recorded message in a mailbox associated with said mailbox-type record.

15. The method of claim 12 wherein said one menu record comprises a menu reference type record and wherein said performing an IVR function associated with said one menu record comprises:

activating a second menu identified by said menu reference type record; and repeating steps (d) through (f) for said second menu.

16. The method of claim 12 wherein said one menu record comprises a read mailbox type record and wherein said performing an IVR function associated with said one menu record comprises:

prompting said caller to enter a password;

determining whether said password is valid;

responsive to a determination that said password is not valid, repeating said prompting and determining until a valid password is entered; and responsive to a determination that said password is valid, playing messages from a mailbox associated with said read mailbox type record to said caller via said telephone line.

17. The method of claim 12 wherein said one menu record comprises a hangup type record and wherein said performing an IVR function associated with said one menu record comprises:

terminating communications with said caller.

18. A user-definable interactive voice mail/voice response (IVR) system for implementation on a personal computer (PC) having a display, the system comprising:

means for creating at least one menu for implementing a user-specified set of IVR functions selected by a user, said means for creating comprising a menu dialog box displayed on a display of said PC for enabling said user to define properties of said at least one menu;

means for adding at least one menu record for implementing an IVR function to said at least one menu, said means for adding further comprising:

means for enabling said user to select a type of menu record to be added to said at least one menu; and a menu record dialog box associated with said selected menu record type and displayed on said PC display for enabling said user to define properties of said at least one menu record; and means for graphically representing on said display in response to selecting said menu record type said at least one menu including said at least one menu record.

19. The system of claim 18 wherein said properties of said at least one menu include one or more of a name of said at least one menu, a password associated with said at least one menu, an icon for representing said at least one menu on a main screen display, and at least one prompt to be played to a caller over a telephone line to which said PC is electrically connected.

20. The system of claim 19 further comprising means for recording said at least one prompt and means for representing a script associated with said at least one prompt on said display.

21. The system of claim 18 wherein said selected menu record type is a mailbox record and wherein said properties of said menu record include one or more of a mailbox name, a DTMF key associated with said mailbox record for accessing said mailbox record and at least one prompt to be played to a caller via a telephone line to which said PC is electrically connected.

22. The system of claim 18 wherein said selected menu record type is a menu reference record and wherein said properties of said menu record include one or more of a referenced menu name, a DTMF key associated with said menu reference record for accessing said menu reference record and a prompt to be played to a caller via a telephone line to which said PC is electrically connected.

23. The system of claim 18 wherein said selected menu record type is a read mailbox record and wherein said properties of said menu record include one or more of a mailbox name, a password associated with said read mailbox record, a DTMF key associated with said read mailbox record, and at least one prompt to be played to a caller via a telephone line to which said PC is electrically connected.

24. The system of claim 18 wherein said selected menu record type is a hangup record and wherein said properties of said menu record include a DTMF key associated with said hangup record and a prompt to be played to a caller via a telephone line to which said PC is electrically connected.

* * * * *